V. BENDIX.
ENGINE STARTER.
APPLICATION FILED SEPT. 21, 1916.
1,294,755.
Patented Feb. 18, 1919.
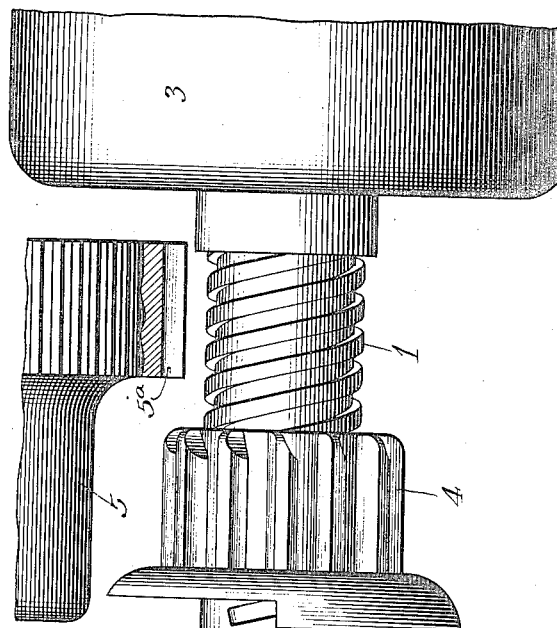
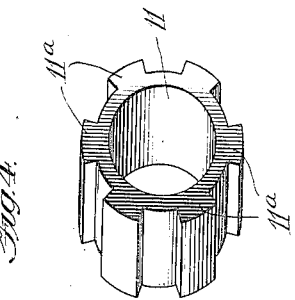
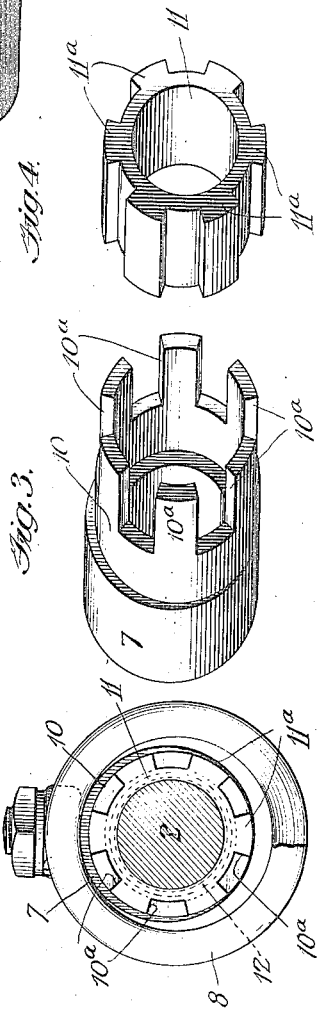
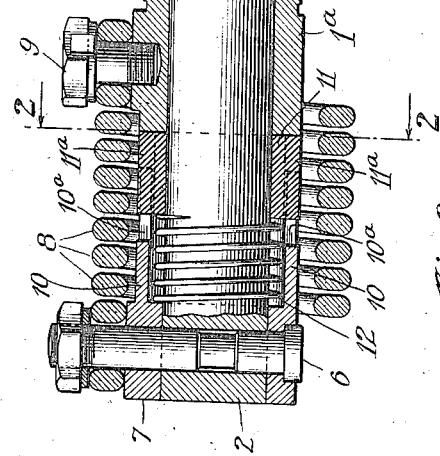
Witnesses
Martin H. Olsen
Robert Dobberman
Inventor
Vincent Bendix
By Rector, Hibben, Davis & Macauley
His Attys

UNITED STATES PATENT OFFICE.

VINCENT BENDIX, OF CHICAGO, ILLINOIS.

ENGINE-STARTER.

1,294,755.  Specification of Letters Patent.  Patented Feb. 18, 1919.

Application filed September 21, 1916. Serial No. 121,503.

*To all whom it may concern:*

Be it known that I, VINCENT BENDIX, a citizen of the United States, residing at Chicago, in the county of Cook and State of Illinois, have invented certain new and useful Improvements in Engine-Starters, of which the following is a specification.

My invention relates to that type of engine starter exemplified in patents heretofore issued to me, for instance, Patents Nos. 1,125,935, dated January 26, 1915, and 1,172,864, dated February 22, 1916, which starters are characterized by a prime mover such as an electric motor, and a transmission or drive for transmitting the power of the motor by means of a rotatable screw shaft and a pinion mounted thereon, to a member of the engine to be started, such as the fly wheel thereof. This drive comprises a screw shaft operated either directly or indirectly by the motor and the pinion screw-threaded on such shaft and having longitudinal movement thereon and rotary movement therewith.

In this type of drive or transmission there is a slight longitudinal yielding movement of the screw shaft for the purpose explained in my said Patent No. 1,125,935, there being a compression space provided between the end of the shaft and a collar or spring barrel which space is indicated at 9 in said patent. The object of my present invention is to provide means for preventing any possibility of the coiled spring forming the resilient driving connection for the screw shaft dropping into or wedging into said space.

In the drawings Figure 1 is a view partly in section and partly in elevation of a drive embodying my invention; Fig. 2 a section on the line 2—2 of Fig. 1; and Figs. 3 and 4 perspectives showing details of certain of the parts.

Referring to the embodiment of my invention as herein shown the drive comprises a hollow screw shaft 1 driven by the extended armature shaft 2 of a starting motor shown at 3, a pinion 4 screw-threaded on the screw shaft and adapted to mesh with a rotatable part of the engine to be started, such as the teeth 5ª of the fly wheel 5. The armature shaft passes axially through the screw shaft and is secured by means of a bolt 6 to a collar 7 at the outer end of the armature shaft. The power of the motor is transmitted to the screw shaft by a resilient driving connection consisting of the coiled spring 8, one end of which is secured to the bolt 6 and the other end to the bolt or stud 9 screwing into an enlargement or collar portion 1ª of the screw shaft. The collar 7 has a cylindrical or barrel extension 10 provided with a series of similar longitudinal slots 10ª which are adapted to receive radial projections or ribs 11ª of a collar 11, such slots and ribs being complementary and the sleeve and collar thereby having telescoping connection with respect to each other. The collar 11 is adapted to slide or float upon the outer end of the armature shaft and is yieldingly held toward the end of the screw shaft with a yielding pressure, as by means of a light coiled spring 12, arranged within the cylinder 10 and bearing at one end against such cylinder and at the other end against the outer end of the collar 11.

It will be noted that this arrangement provides support for the spring 8 in case it should be coiled downwardly upon the cylinder and collar and leaves no open space into which any coil of such spring could drop or wedge. At the same time the longitudinal yielding movement of the screw shaft is permitted without any interference. The proper position of the collar 11 is maintained by the spring 12, and as shown in Fig. 1 the longitudinal movement is permitted between the outer ends of the ribs 11ª and the bottoms of the slots 10ª.

I claim:

1. A power transmission mechanism for engine starters including two rotatable members having a limited axial movement one toward the other, a coiled spring driving connection between them, and means for bridging the entire space between such members and within the spring and thereby preventing any inward distortion of the spring coils from interfering with said axial movement of the members.

2. A power transmission mechanism for engine starters including two rotatable members having a limited axial movement one toward the other, a coiled spring driving connection between them, and a part arranged inside the spring and coöperating with one of the two said rotatable members to form a slip joint therewith.

3. A starter for engines comprising a rotatable screw-shaft, a pinion on the screw shaft, a driving shaft, a coiled spring driving connection between said shafts, and two members arranged within the spring and having slip joint connection with each other.

4. A starter for engines comprising a rotatable screw shaft, a pinion on the screw shaft, a driving shaft, a coiled spring driving connection between said shafts, two members arranged within the spring and having slip joint connection with each other, and means for holding said members in extended condition with a yielding pressure.

5. A starter for engines comprising a rotatable screw shaft, a driving shaft, a collar connected with the driving shaft, a sleeve, said collar and sleeve have a slip joint connection with each other, and a coiled spring driving connection surrounding the collar and sleeve and connected respectively with the collar and screw shaft.

6. A starter for engines comprising a rotatable screw shaft, a driving shaft, a collar connected with the driving shaft and having a cylindrical extension, a sleeve adapted to telescope with such extension, and a coiled spring driving connection surrounding the extension and sleeve and connected with the collar and screw shaft.

7. A starter for engines comprising a rotatable screw shaft, a driving shaft, a collar connected with the driving shaft and having a cylindrical extension, a sleeve adapted to telescope with such extension, a coiled spring driving connection surrounding the extension and sleeve and connected with the collar and screw shaft, and means for holding said extension and sleeve in extended condition with a yielding pressure.

8. A starter for engines comprising a rotatable screw shaft, a driving shaft, a collar connected with the driving shaft and having a cylindrical extension, a sleeve adapted to telescope with such extension, a coiled spring driving connection surrounding the extension and sleeve and connected with the collar and screw shaft, and a spring acting on the sleeve for holding it in extended condition with respect to said extension.

9. A starter for engines comprising a rotatable screw shaft, a driving shaft, a collar connected with the driving shaft and having a cylindrical extension, a sleeve adapted to telescope with such extension, and a coiled spring driving connection surrounding the extension and sleeve and connected with the collar and screw shaft, said extension having slots and said sleeve having radial ribs received by such slots.

10. A starter for engines comprising a rotatable screw shaft, a driving shaft, a collar connected with the driving shaft and having a cylindrical extension, a sleeve adapted to telescope with such extension, and a coiled spring driving connection surrounding the extension and sleeve and connected with the collar and screw shaft, said sleeve being mounted to float upon the driving shaft.

11. A starter for engines comprising a rotatable screw shaft, a driving shaft, a collar connected with the driving shaft and having a cylindrical extension, a sleeve adapted to telescope with such extension, a coiled spring driving connection surrounding the extension and sleeve and connected with the collar and screw shaft, said sleeve being mounted to float upon the driving shaft, and a spring adapted to press the sleeve against one end of the screw shaft and to hold the sleeve in extended condition with respect to said extension.

12. A starter for engines comprising in combination with a motor driven shaft, a screw-threaded shaft in the form of a sleeve mounted on the motor driven shaft and having a yielding longitudinal movement longitudinally thereof, a pinion mounted on the screw-threaded shaft, a coiled spring surrounding one end of the motor-driven shaft and connected with that shaft and screw shaft respectively, and two telescoping members arranged within the spring and around said end of the motor-driven shaft.

VINCENT BENDIX.